Dec. 3, 1935.  I. E. McCABE  2,023,143

VALVE CONSTRUCTION

Filed Jan. 6, 1933

INVENTOR
IRA E. McCABE
BY Langdon Moore
ATTORNEY

Patented Dec. 3, 1935

2,023,143

UNITED STATES PATENT OFFICE 2,023,143

VALVE CONSTRUCTION

Ira E. McCabe, Chicago, Ill.

Application January 6, 1933, Serial No. 650,451

3 Claims. (Cl. 251—84)

This invention relates to improvements in valve construction and more particularly to that type of valve particularly adaptable to control the flow of fluid fuel.

This particular type of valve is disclosed in this applicant's copending application, Serial No. 544,517, filed June 15, 1931, now Patent No. 1,923,681, of August 22, 1933, as including in a valve casing a valve for controlling the flow of fluid fuel from a source of supply having a seat of hard metal with a valve head of similar metal to rotate in contact with the seat and the contacting parts ground and lapped in a manner similar to that employed in the well known Johansson gauges and a discharge valve from the casing for regulating the discharge therefrom which latter valve includes a circular valve seat in which a sliding valve head having a V-shaped discharge passage of increasing depth is mounted upon a valve stem in screw-threaded engagement with the casing and passing through a stuffing box.

In practice it has been found that when a rotatable valve of hard metal with the head and seat in lapped relation is covered by a casing screw-threaded to the stationary member of such a valve, as is customary in such valve constructions, the stresses and strains set up in the stationary member by the contact of the valve casing when tightly secured thereto acts upon the ground portion forming the lapped joint to throw this surface out of a true plane defeating the advantages of a lapped surface.

It is an object of this invention to provide a valve of the type described with a novel means for securing a casing thereabout in such a manner that it will not disturb the ground surfaces contacting in true lapped relation and also to provide a discharge valve for such a casing which may be operated without the employment of a stuffing box and which will neither stick nor clog.

With these and other objects in view reference is made to the accompanying sheet of drawing which illustrates preferred forms of this invention.

In the drawing—

Figure 1:
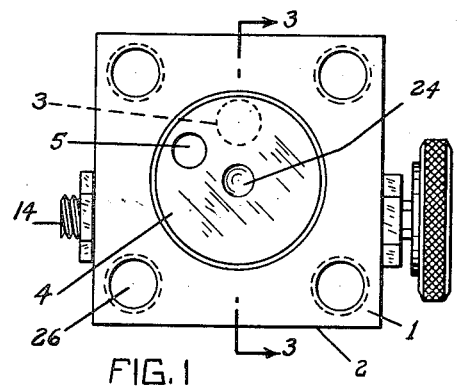
Figure 1 is a view in end elevation of the lapped valve seat and rotatable valve head with the valve casing removed.
Figure 2:
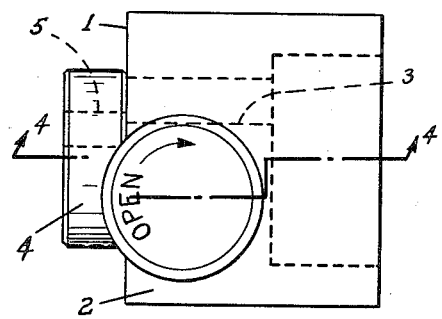
Figure 2 is a view in side elevation of Figure 1.
Figure 3:
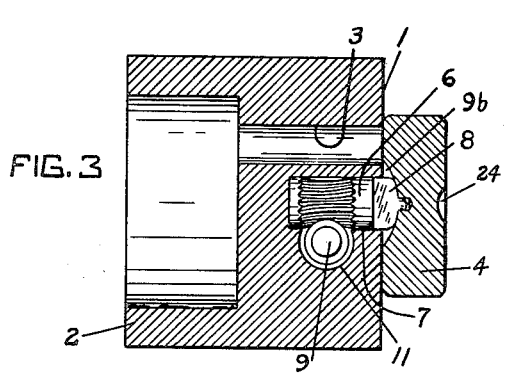
Figure 3 is a view in vertical section taken on the line 3—3 of Figure 1.

In the forms illustrated in Figures 1 to 6, inclusive, the valve seat 1 is formed upon the closed end of a chambered block 2 having a port 3 passing therethrough at right angles to the surface 1 with a rotatable valve head 4 having a port 5 adapted upon rotation to register with the port 3. The block 2 and valve head 4 are constructed of a suitable material adapted to be ground and finished to present a surface lying substantially in a single plane. The valve seat surface extends across the entire end of the block 2 and is contacted by a similar surface upon the valve head 4, so that when the two are placed in contact with each other, and the valve head rotated upon the seat surface, air is excluded from between the head and seat and there can be no seepage between the head and seat of the fluid which passes through the valve.

Figure 4:
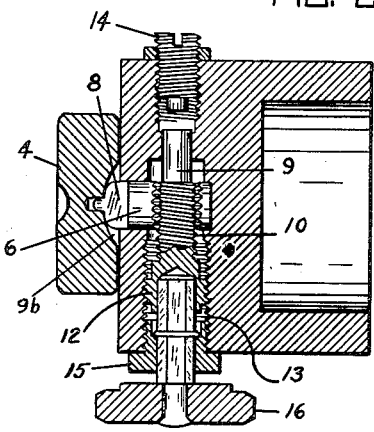
Figure 4 is a view in horizontal section taken on the line 4—4 of Figure 2.

The valve head is caused to rotate to bring its port 5 in register with the port 3 in the block by means of a worm-shaft 6 mounted to rotate in a well 7 in the axis of the block 2 and concentric with the valve head 4. The worm shaft 7 is provided with a key 8 extending beyond the valve seat surface 1 and entering a key receiving slot 9b in the valve head 4. An operating shaft 9 threaded at 10 to mesh with the worm on the shaft 6 is mounted in a transverse bearing or bore 11 in the block 2. As shown in Figure 4, the operating shaft at one side of the worm engaging threads is provided with a screw-threaded portion 12 of opposite pitch to the worm engaging screw 10 which portion 12 engages a screw-threaded portion 13 in the walls of the bearing 11. The bearing 11 is restricted on the side opposite the screw-threaded portion to rotatably and slidably support the shaft 9 and the exterior of this end of the bearing is screw-threaded to receive an adjustable stop 14. The exterior end of the screw-threaded portion of the bearing is provided with an adjustable stop 15 which mounts a rotatable shaft operating member 16 keyed into the end of the operating shaft and having a sliding connection therewith.

Upon rotation of the member 16 the operating shaft 9 is rotated imparting a rotation to the valve head 4 and as the screw-threaded portion 12 is of opposite pitch to the worm engaging thread, the shaft will be given a longitudinal, as well as a rotative movement. The stops 14 and 15 are adjustable so that the amount of rotation imparted to the valve head 4 may be limited in both directions. In this form, there is only a partial rotation of the valve head allowed to open and close the valve. In the modification illustrated in Figure 5, the bearing 11a is only extended from one side a slight distance beyond the worm shaft well 7 and the operating shaft 9a is provided with a collar 17 adapted to be held in rotative relation upon a shoulder 18 in the bearing 11a by the closure or stop 19, so that upon continued rotation in either direction, the operating shaft is held against longitudinal movement and the valve head may be caused to make complete rotations in either direction, if so desired.

Figure 6:
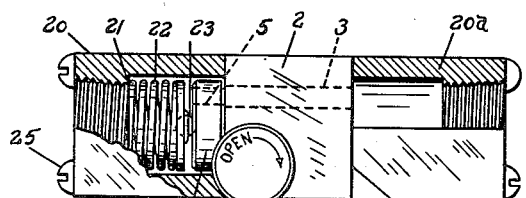
Figure 6 is a view in side elevation of a completed valve with parts broken away and partly in section.

Figure 6 illustrates one preferred form or construction of a valve of this character to be interposed in a fuel line. A cap 20 is provided preferably of the same material as the block 2 which forms a chamber about the rotatable valve head 4. The end of the cap is screw-threaded to receive a pipe for conducting the fluid to the valve and forms a shoulder 21 adapted to be engaged by a spring 22 to insure the contact of the flat surface of the valve head with the flat surface of its seat and preferably by causing the spring to press upon a ball 23 engaged in a concentric depression 24 in the outer surface of the cap 4. The block 2 is preferably square in cross section as shown in Figure 1, and the ground surface which forms the seat extends across the entire end of the block. The cap 20 is similarly shaped and the portion engaging the end of the block 2 is likewise ground to form a flat surface in substantially the same plane and the two flat contacting surfaces form a lapped joint and are preferably held in contact by screw-threaded bolts 25 passing through apertures 26 in each corner of the cap and engaged in screw-threaded recesses corresponding thereto in the block 2. While in the form shown the block 2 is provided with but a single port 3 and the valve head with but a single registering opening, a plurality of said ports with corresponding openings in the valve head for registering therewith may be provided. A cap 20a of the same construction as the cap 20 is secured upon the opposite face of the block 2 in the same manner as heretofore described. The opposite surface 27 of the block 2 is also ground to form a flat surface substantially in the same plane, so that the cap 20a is held in lapped relation to the surface 27. The cap 20a provides means for connecting to the fluid fuel pipe.

Figure 5:
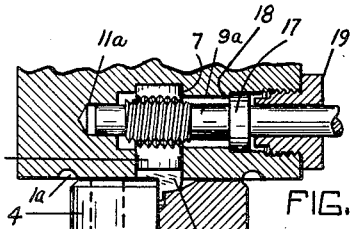
Figure 5 is a fragmentary detail view similar to Figure 4 of a modification.

In joining lapped surfaces such as those of the block 2 and caps 20 and 20a, as shown in Fig. 6, the lapped surfaces will have the tendency, when they slide one on the other with a slight inward pressure, to take hold as though magnetized which makes possible, during the process of manufacture, the joining of the lapped parts to protect their highly polished surfaces without necessity of bolting them together. However, in assembling the cap over the valve head 4 it is necessary merely to place the surfaces together and, in addition to the anchoring bolts by which they are held in final assembly, it may be desirable to shellac or lacquer the contacting surfaces of the block and cap. In so doing it is necessary to provide a groove 1a around the valve head, as shown in Fig. 5, to prevent the shellac or lacquer from working around the valve head and preventing the movement thereof. The groove 1a would also be necessary should it be desirable to make the caps of some other material other than that found necessary to provide a perfect lapped joint with the lapped valve seat, in which case shellac could advantageously be employed to seal the caps to the seat thus eliminating the necessity of finishing off the ground contacting surfaces of the caps to as high a degree of lapped perfection as that provided by the valve seat for the valve head.

The valves above described are of the type in which it is customary to rotate the head to entirely close the valve or entirely open the valve. It is to be noted in this construction that the rotation is imparted by mechanism entirely enclosed or contained within the block 2 forming the valve seat, and there is no necessity of a stuffing box because the mechanism is entirely out of contact with the fluid passing through the valve. The providing of lapped joints between the valve seat or block 2 and the contacting portions of the caps 20 and 20a allows the valve cap to be drawn tightly upon the block preventing any stresses or strains which would result in the deformation of the ground surface of the seat, thus allowing a perfect lapped joint between the seat and rotating valve head.

Figure 7:
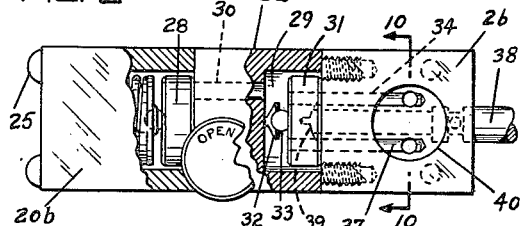
Figure 7 is a view similar to Figure 6 illustrating a different type of valve.

At times it is desirable to employ a valve of the type just described in connection with another valve which meters the fluid passing therethrough to the first mentioned valve, and such a construction is illustrated in Figures 7, 8, 9 and 10. Referring to Figure 7, the block or valve seat 2a for the metering valve 28 is cut out on the side opposite the metering valve to form a chamber 29 which is held in lapped relation to the valve seat or block 2b. The metering valve 28 is enclosed by a cap 20b similar to the cap 20 in Figure 6, and the three sections are held together in lapped relation to each other by screw-threaded bolts 25 in the same manner as described in connection with Figure 6. In this particular case, the metering valve head 28 is provided with but a single opening adapted to cover and uncover a single port 30 in the block 2a which opens into the chamber 29. The valve seat 2b mounts a rotatable valve head 31 in lapped relation to the valve seat 2b insured by the spring 32 which engages the bottom of the chamber 29 and a ball 33 mounted in a recess upon the valve 31 and concentric therewith. The valve seat 2b is provided with four ports 34, 35, 36, and 37 equidistantly spaced about the axis of the block 2b and equidistant from each other. The valve head is provided with corresponding apertures adapted to be brought into registration with the said ports. The valve head is rotated by means of an operating shaft 38 rotatably mounted axially of the block 2b having a key 39 in engagement with a slot therefor upon the inside of the valve head 31 which shaft may be held against longitudinal movement in any desired manner and may be rotated in any manner desired to cause the apertures in the valve head to register with the ports in the valve seat. With this means of operating the valve head, one side of the block 2b is recessed to form a chamber 40, the walls of which are screw-threaded for connection with the fluid pipe, and the bottom of which is provided with wells 41 and 42 into which the ports in the block 2b open, the ports 34 and 35 opening into the well 41 and the ports 36 and 37 opening into the well 42.

Figures 8, 9:
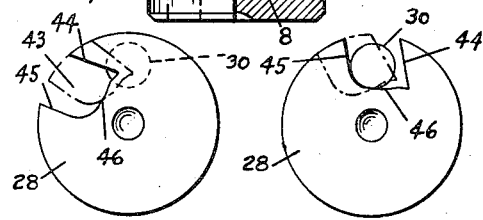
Figure 8 is a view in end elevation of a rotating head adapted to metering valves illustrating a small opening in full lines and a larger opening in dotted lines.
Figure 9 is a similar view of a similar valve head illustrating the position with the port entirely uncovered and in dotted lines the position when partially uncovered.
Figure 10:
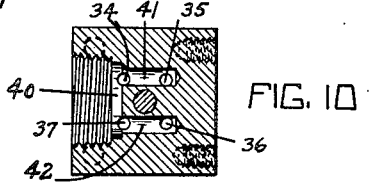
Figure 10 is a view in vertical section taken on the line 10—10 of Figure 7.

The metering valve head 28 is provided with a cut out portion 43 of such shape that it will progressively and gradually uncover the port 30 of the valve seat 2a, as shown in Figures 8 and 9. The head 28 is preferably formed with spaced apart parallel walls 44 and 45 connected by a reverse curved portion 46 with the wall 45 in a plane at one side of the axis of the head 28 with the plane of the wall 44 on the other side of said axis with the walls 44 and 45 separated by a space slightly greater than the diameter of the port 30. The valve head is customarily rotated in a clockwise direction and the curved wall 46 is so shaped that as the opening 43 begins to uncover the port 30, a triangular opening is formed, as shown in full lines in Figure 8, which upon continued rotation of the valve head remains substantially a triangular shape with an increasing base, as shown by dotted lines in Figures 8 and 9, until the port 30 is entirely uncovered, as shown in full lines in Figure 9. By this construction the lapped head and seat surfaces prevent any seepage of the fuel and the head may be rotated to provide an opening of any desired size to meter, or regulate, the flow of the fuel through the port 30. This is a great advantage over the usual type of metering valve employing a circular seat with a cylindrical valve head having a depression of increasing size upon one side thereof mounted to reciprocate within the seat to control the flow of the fluid through the seat. In valves of the latter type just described, it is practically impossible to have the reciprocating valve head form a sufficient fit with the circular valve seat to prevent the seepage of the fluid between the cylindrical portion of the head and seat that will not only vary with the different types of fluids, but will prevent the exact metering of the fluid, when in practical use, for which the valve was tested at the factory. If the fit is close enough to prevent seepage at the factory, it will take considerably more power than desirable to reciprocate the head, and then after continued reciprocation the parts will wear and a seepage will occur. Furthermore, in many instances, the fluid is of such character that if a seeepage occurs between the cylindrical portion of the head and the seat, and the valve is allowed to remain in one particular position for a considerable length of time, sediment in the liquid tends to clog the cylindrical portion of the opening, but not the slotted portion, thus reducing the flow as originally adjusted. This condition is due to the very minute space between the cylindrical wall and the adjustable piston. In a metering valve of this type, just described, a stuffing box is also required in the casing through which the valve stem must necessarily pass to impart the reciprocation to the valve head.

The constructions embodying this invention, described above, provide not only a rotatable lapped valve head operable without the employment of stuffing boxes, but also provide a cap which may be secured over the rotating head in such manner as not to disturb the ground surface of the valve seat, that must necessarily remain a flat surface and lie entirely in the same plane to form a lapped joint with the rotating head, and likewise provide a metering valve which is positive in its action and which will continue when in use to meter the fluid continuously in the same manner in which it was adjusted at the factory.

What I claim is:

1. A lapped joint valve including a seat block having a ground flat surface on one end, a rotatable head having a ground flat surface on one side in lapped relation upon the flat surface of the seat mounted to rotate axially thereon, a port in the seat block at one side of its axis, a port in the rotatable head adapted to be brought into and out of register with the seat port, a rotatable shaft mounted in the seat block and in axial engagement with ground side of the head adapted to rotate the head to cover and uncover the seat port, said shaft having a worm gear thereabout, and means mounted within the seat block for the application of power to rotate said shaft and with it the valve head, said means including an operating shaft having a thread about its intermediate portion meshing with said worm gear rotatably mounted in a bearing at right angles to the worm gear shaft with one end adapted to be connected to means upon the exterior of the side of the seat block for imparting rotation thereto, a bearing passing through the seat block and interiorly screw-threaded adjacent each end, an adjustable screw-threaded stop adapted for insertion therein on each side of the seat block, said threaded operating shaft enlarged and screw-threaded at a pitch opposite to the worm engaging threads at one end to engage the screw-threaded bearing, a rotatable shaft operating member mounted axially in the adjustable stop at that end of the bearing having a sliding keyed connection with the screw-threaded end of the operating shaft for imparting movement thereto.

2. A lapped joint valve including a seat block having two oppositely disposed ground flat surfaces, a port therethrough at one side of its axis, a rotatable head having a ground flat surface on one side in lapped relation upon the flat surface upon one side of the seat block mounted to rotate axially thereon, a port in the rotatable head adapted to be brought into and out of register with the seat port, a rotatable shaft mounted in the seat block in axial engagement with the ground side of the head adapted to rotate the head to cover and uncover the seat port, and means mounted within the seat block for the application of power to rotate said shaft and with it the valve head, a chambered casing having the walls at one end thereof ground to a flat surface adapted to form a lapped joint upon the ground flat surface of the seat block mounting the rotatable head, screw-threaded bolts passing through the casing to engage the seat block and hold the casing in lapped relation thereon, said casing chambered to surround the valve head and mounting, a spring therein bearing against a ball mounted in an axial spherical depression in the valve head, and the opposite end of the casing threaded to receive a pipe, a second similar casing about the opposite ground surface of the seat block secured in the same manner to the seat block and the end opposite the block screw-threaded to receive a pipe and communicating with the chamber therein.

3. A lapped joint valve including a seat block having two oppositely disposed ground flat surfaces, a port therethrough, at one side of its axis, a rotatable head having a ground flat surface on one side in lapped relation upon the flat surface upon one side of the seat block mounted to rotate axially thereon, a port in the rotatable head adapted to be brought into register with the seat port, a rotatable shaft mounted in the seat block in axial engagement with the ground side of the head adapted to rotate the head to cover and uncover the seat port, and means mounted within the seat block for the application of power to rotate said shaft and with it the valve head, a chambered casing having the walls at one end thereof ground to a flat surface adapted to form a lapped joint upon the ground flat surface of the seat block mounting the rotatable head, said casing chambered to surround the valve head and mounting, a spring therein bearing against a ball mounted in an axial spherical depression in the valve head, and the opposite end of the casing threaded to receive a pipe, a chamber formed in said seat block opposite the rotatable valve head, an additional similar seat block having a ground flat surface coextensive on one end, a plurality of ports arranged at one side of the axis in said additional seat block, a rotatable valve head having a ground flat surface on one side in lapped relation upon the said flat surface of said additional block mounted to rotate thereon, a similar number of ports in said rotatable head adapted to be brought into and out of register with the said respective seat ports, a rotatable shaft in said additional seat block in axial engagement with the ground side of the valve head adapted to cover and uncover said seat ports, said shaft extending axially through said seat block and extending beyond the side opposite the head for the application of power, a chamber formed on one side of said additional seat block connecting with each of the plurality of said ports and having a portion threaded to receive a pipe and screw-threaded bolts passing through the chambered seat block to engage the casing and additional seat block and hold them in lapped relation thereon.

IRA E. McCABE.